United States Patent [19]

Maes et al.

[11] Patent Number: 5,264,689
[45] Date of Patent: Nov. 23, 1993

[54] RECHARGEABLE PREPAID MEMORY CARD WITH BOTH UNIT AND PAGE COUNTERS

[75] Inventors: Philippe Maes, Peynier; Eric Depret, Caen; Philippe Hiolle, Herouville Saint Clair, all of France

[73] Assignees: Gemplus Card International, Aix-en-Provence; La Poste; France Telecom, both of Paris, all of France

[21] Appl. No.: 817,869

[22] Filed: Jan. 7, 1992

Related U.S. Application Data

[63] Continuation of Ser. No. 462,072, Jan. 8, 1990, abandoned.

[30] Foreign Application Priority Data

Jan. 11, 1989 [FR] France ................................ 89 00256

[51] Int. Cl.⁵ .............................................. G06K 5/00
[52] U.S. Cl. .................................. 235/492; 235/379; 235/380
[58] Field of Search ........................ 235/379, 380, 492

[56] References Cited

U.S. PATENT DOCUMENTS

| 4,204,113 | 5/1980 | Giraud et al. | 235/375 |
| 4,367,402 | 1/1983 | Giraud et al. | 235/492 |
| 4,501,958 | 2/1985 | Glize et al. | 235/380 |
| 4,822,984 | 4/1989 | Remery et al. | 235/380 |
| 4,864,110 | 9/1989 | Guillou | 235/379 |
| 4,908,499 | 3/1990 | Guion | 235/380 |

Primary Examiner—Eugene R. LaRoche
Assistant Examiner—Christopher R. Glembocki
Attorney, Agent, or Firm—Roland Plottel

[57] ABSTRACT

The disclosure concerns memory cards and, more particularly, cards that are used as means of prepayment in installations for the dispensing of products and services. It is proposed to make the memory rechargeable by means of a credit counter, incrementable from outside the card, and a comparator which compares the content of this counter with that of a page counter. The page counter records the number of pages of P accounting units already used up. A no more credit signal is emitted on an external terminal when the content of the page counter reaches the content of the credit counter. A security system against the fraudulent recharging of the card is set up by an algorithm bringing into play the content of the credit counter and an identification number contained in the card.

5 Claims, 1 Drawing Sheet

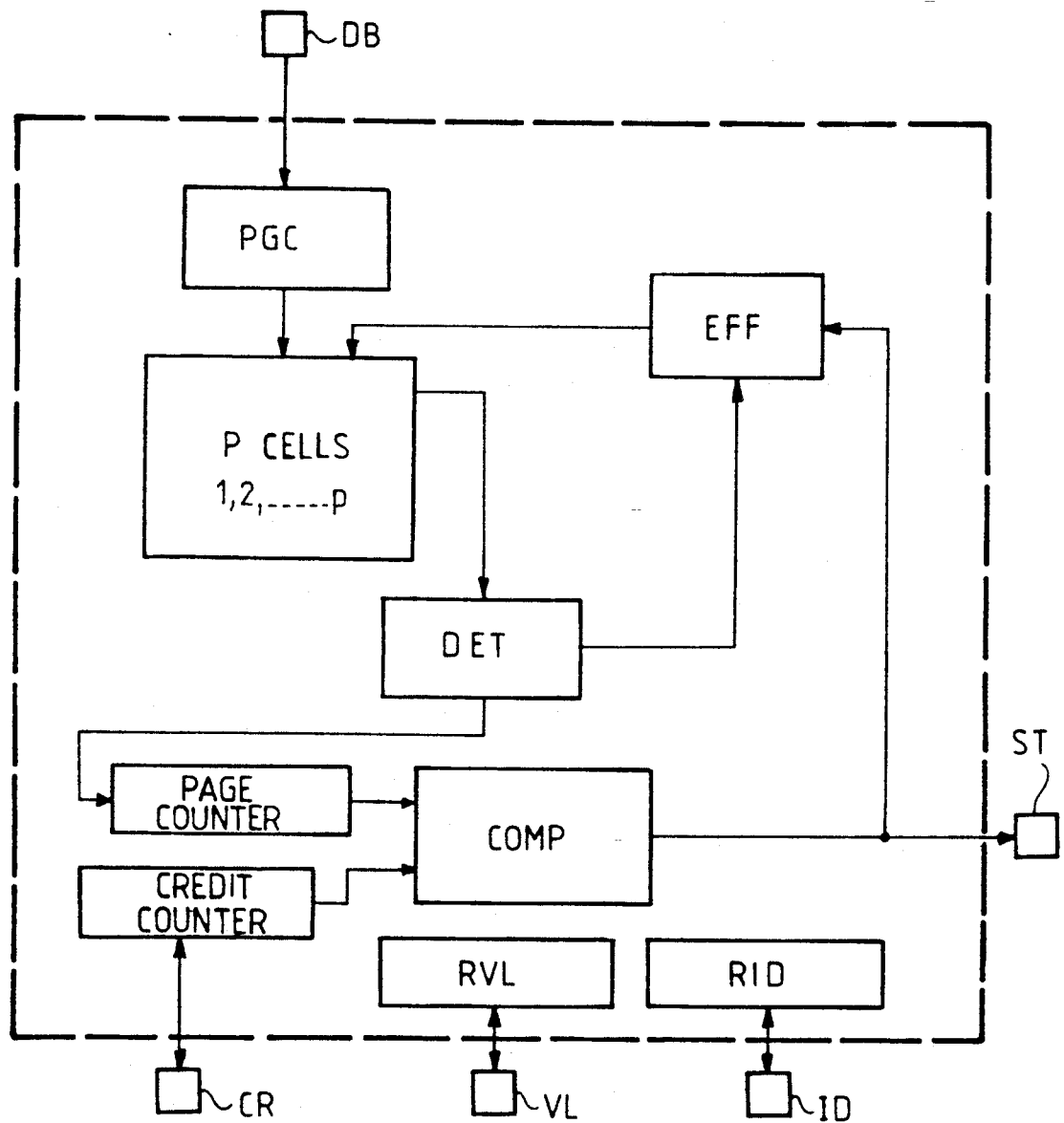

RECHARGEABLE PREPAID MEMORY CARD WITH BOTH UNIT AND PAGE COUNTERS

This application is a continuation of application Ser. No. 07/462,072, filed Jan. 8, 1990, now abandoned.

BACKGROUND OF THE INVENTION

1. Field of the Invention

The invention concerns memory cards and, more particularly, those used as a means of prepayment in installations for the dispensing of products and/or services.

2. Description of the Prior Art

A typical example of a memory card to which the present invention can be applied is the prepaid phone card which is purchased for a certain monetary value. This value is memorized directly or indirectly in the card and is decremented as and when it is used. The invention, however, can also be used in other situations where accounting units are recorded in the card and are decremented or incremented as and when they are used. These units may or may not have a monetary value. In the rest of this description, we shall consistently use the example of the prepaid telephone card for it is the most eloquent example that could be used to explain the advantages of the invention.

In a previous embodiment of a prepaid card, a non-volatile electrically programmable and electrically non-erasable memory is used as a means of storage of the prepaid value.

In this embodiment, the non-volatile electrically programmable memory (EPROM) contains P memory cells. Each cell corresponds to an elementary accounting unit of the commercial value. The cells are initially blank. During use, a card reader associated with the dispensing of products or services gives successive pulses for programming the P cells one after the other, as and when the dispensing takes place. The residual value of the card corresponds to the number of cells that have not yet been programmed. When all the cells are programmed, the prepaid credit is exhausted.

In another embodiment, the memory is electrically erasable (EEPROM). Attention will be paid more particularly to this latter example which more clearly highlights the advantages of the invention. The memory has P cells, each corresponding to an accounting unit. There is furthermore provision for a counter, a register containing a fixed number Z corresponding to a total commercial value $Z \times P$ of the card expressed in accounting units, and a comparator to compare the content of the counter and that of the register. When the P cells of the memory have been programmed, the counter is incremented by one unit, and the cells are all erased simultaneously, then again programmed successively, one after the other. The content of the counter gets incremented after each consumption of P accounting units. When the content of the counter reaches the value specified in the register, the comparator delivers a no more credit signal which prevents the continued use of the card. Thus, through the fact that the card is electrically erasable, a card is made having a credited value of $Z \times P$ although the memory has only P cells.

Of course, the counter is incremented by a circuit internal to the card. It is not accessible at the external terminals of the card as, in this case, fraudulent activity would become possible.

In practice, it is possible to conceive of cards containing, for example, a 50-cell memory (P=50), and cards of 50, 100, 150, etc. accounting units could be commercialised.

The erasable character of the memory is used to preserve a limited number of memory cells (P cells). At the same time, broad possibilities of choice will be retained as regards the commercial value of the card ($P \times Z$). The manufacturer of the integrated circuit will have only one circuit to design, and all he has to do to assign one commercial value or another to the card is to use program the content of a register (in practice a read-only memory) defining the number Z.

The present invention proposes mainly to use the erasable character of the memory to make the card rechargeable, i.e. so that the user who has exhausted his credit can purchase an additional quantity of accounting units without changing the card.

Another aim of the present invention is that when the card contains only a small number of accounting units, these units should not be lost to the user, even when he recharges the card.

SUMMARY OF THE INVENTION

According to the invention, there is proposed a memory card serving as a means for the counting of units, organized to count up to $N \times P$ units organized in N pages of P units each, the card having a memory zone, each cell of which represents an accounting unit, the programming of this cell in a given state representing the counting of a unit, the card having a page counter and an incrementation circuit internal to the card to increment the page counter by one unit after each complete programming of the P cells of a page, said card having an instructed value counter or credit counter, the content of which represents a total value of Z pages of units, and a comparator to emit a no more credit signal when the page counter indicates that Z pages have been used up, the instructed value counter being arranged so as to be incremented from outside the card.

Instead of the manufacturer's having to fabricate different cards depending on their commercial value, only one card could be fabricated, and it is by the initial charging and the subsequent rechargings of the card that the credit value will be recorded in the card.

This approach can be applied chiefly if the memory is electrically erasable. It is here that the invention assumes all its value for it makes utmost use of the erasable character of the memory. However, the approach can be applied also if the memory is not erasable, in which case the memory zone contains N pages of P cells. The page counter is incremented whenever a full page is used up, and the recharging operations consist in incrementing the instructed value counter to increase the number of pages of P cells which can be programmed, the limit of the successive incrementations being reached when the content of the instructed value counter reaches the value N.

In the most worthwhile example of an erasable memory, the memory zone contains P cells, i.e. it corresponds to only one page of accounting units. When the P cells of the card have been programmed, a page counter incrementation signal is delivered (this signal is set up within the card), and the P cells are erased. The successive programming of the P cells can then start again. When the content of the page counter reaches that of the instructed value counter, a no-more-credit signal is emitted, invalidating the subsequent functioning of the card and prohibiting, for example, the erasure of the P cells.

The card may then be recharged by incrementation of the instructed value counter, within the limits of its counting capacity. However, the card can also be recharged before the no-more-credit signal is emitted. If there are remaining accounting units available in the memory, they will not be lost since the recharging acts on the instructed value counter and not on the programming of the memory cells.

Preferably, the page counter and also the instructed value counter are strictly irreversible, i.e. not only do they count in only one direction, but they also do not return to zero when they have reached their maximum counting capacity.

Given that the instructed value counter is accessible from the external connection terminals of the card, it is highly desirable, and sometimes indispensable, to provide for security of access to this counter to prevent fraudulent activity. The invention proposes a system for the use of cards with a particularly simple security system, in the form of two registers in the card. The first register, which is the identification register, contains an identification number of the card, for example a serial number recorded at the very outset in the card. This number is accessible in reading mode but, in principle, its content cannot be modified. The register may be formed with a read-only memory or an electrically programmable memory with floating gate. The second register contains a validation code which is the result of a computation algorithm bringing into play both the content of the first register and the content of the instructed value counter. The validation code is computed by the card recharging machine which reads the serial number of the card, reads or knows the new content of the instructed value counter and writes the result of the algorithm in the form of a validation code in the second register. The validation code is verified in the card reader when the card is used: The reader reads the serial number, the content of the credit counter and the content of the validation register. It ascertains that there is compatibility among these three contents, taking into account the encoding algorithm used.

Among the advantages of the invention, it will be noted that the card is compatible with the non-rechargeable cards such as those described above: it will be easy to see to it that the future applications work with rechargeable or non-rechargeable cards, without distinction.

BRIEF DESCRIPTION OF THE DRAWING

Other characteristics and advantages of the invention will appear from the following description, made with reference to the appended drawing wherein the single figure gives a schematic view of the integrated circuit of the memory card according to the invention.

DESCRIPTION OF A PREFERRED EMBODIMENT

The figure shows the architecture of the integrated circuit of the rechargeable memory card according to the invention. This figure shows only the parts specifically concerned by the invention. It notably does not show the circuits handling the transmissions of signals between the card and the card reader or between the card and the machine for recharging accounting units.

It shall be noted furthermore that various signal input or output terminals have been shown in the figure. However, certain terminals shown as being terminals that are physically or electrically separated could be brought together in the practical embodiment. For, it is important to reduce the number of input/output terminals of the card to the minimum, and there is frequently provision for multiplexings of different signals at common terminals to achieve this goal.

The example of the figure corresponds to a rechargeable prepaid telephone card, using an electrically erasable and electrically programmable memory (EEPROM).

The integrated circuit has an EEPROM zone designated by the reference MEM. This zone has P cells, each corresponding to an accounting unit. The memory may be constituted in matrix form with row and/or column addressing decoders or, again, in the form of registers, for example shift registers etc.

The figure shows a terminal DB providing access to the card. Debitting pulses arrive through this terminal. When the card is used in a public telephone booth, these pulses come from the telephone line itself. Each pulse has the effect of programming a cell 1,2, ... p of the memory MEM, and the address of the cell to be programmed is incremented, at each pulse, so that all the cells of the memory which have not yet been programmed are programmed successively. Programming circuits for prepayment cards are known and shall not be described in greater detail. The figure simply indicates the presence of a PGC programming circuit between the terminal DB and the memory MEM.

A circuit DET for detecting the end of programming of the memory MEM is provided for. This circuit gives a signal when the last cell ($p^{th}$ cell) is programmed. A circuit EFF for the total erasure of the memory MEM is also provided for. It erases the P cells of the memory when it receives the order to do so from the circuit for detecting the end of programming of a complete page of P units.

The figure also shows two counters CPP and CPC and a comparator COMP to compare the contents of the two counters.

The counters are irreversible: they count in only one direction (for example incrementation only), and they do not return to zero or to a prior content when they have reached their maximum capacity. They can count in binary mode or in BCD mode or in any other mode.

The first counter, CPP, is the counter of pages of accounting units that have been used up. It is incremented by the detection circuit DET (namely by a circuit internal to the card) after each programming of a full page of accounting units.

The second counter CPC is the instructed value counter or credit counter. Its content is charged from outside the card, more precisely by a credit recharging machine. This is why a link has been shown between the credit counter CPC and an external recharging terminal CR. As stated above, this terminal has been shown as an autonomous one, but it could be the same as another one, for example the terminal DB, since the recharging of credit will not be done during use in a telephone booth.

It may be assumed that the initial content charged or loaded in the counter CPC is equal to Z. This is the content when the unit leaves the factory or after an initial passage through a credit recharging machine. The initial content of the page counter CPP is equal to zero. When the card is being used, the cells of the memory MEM will be programmed one by one as a function of the consumption of telephone units (determined by the reception of the debitting pulses at the terminal DB). When the P cells have been programmed, the counter CPP is incremented by one unit and the memory is completely erased, and so on until the page counter CPP reaches the value Z recorded in the instructed value counter CPC. The comparator COMP then emits a no more credit signal on an external terminal ST of the card. This signal stops, for example, the telephone call or performs any other action, including action on the internal functioning of the card. In particular, it may inhibit the erasure of the memory which ought to take place when the counter CPP reaches the value Z.

If the card is then introduced into a credit recharging machine, this machine may increment the credit counter by M units, for example up to a value of $Y=Z+M$. The user pays for this incrementation, for example proportionately to this incrementation, or by a sliding scale tariff. He then has a fresh credit available of $(Y-Z)P$ accounting units. The working of the card is then exactly the same as above.

The card is no longer rechargeable when the instructed value counter has reached its maximum capacity N.

The card can be recharged, as was stated, even when the credit has not been exhausted, for example when the page counter shows a content $Z'$ smaller than the content of the instructed value counter and when only a part $P'$ of the P cells of the memory has been programmed. The remaining credit $(Z-Z'-1)P+P-P'$ remains usable, and the card recharged up to an instructed value Y includes an overall credit $(Y-Z')P-P'$ irrespectively of $Z'$ and $P'$.

The figure again shows two registers used to provide for the security of the rechargings of the card should the integrated circuit of the card be a simple wired logic circuit using no microprocessor that could provide for this security system.

The first register RID is an identification register for identifying the card. It may include, for example, a serial number of the card, or a batch number or any fixed code number. The more the identification code is proper to the card, the greater is the extent to which the security is ensured. In other words, the security level is very high if two separate cards have practically no chance of having the same code. This first register RID is, for example, made in the form of a read-only memory (ROM) or an electrically programmable register with floating gate. It is accessible in reading mode from an external terminal ID so that the card reader being used or the credit recharging machine can read the code that it contains.

The second register RVL is a validation register. It contains a validation code making it possible to ascertain that there has been no fraudulent activity. It is accessible in reading mode by the card reader or the credit recharging machine. It is accessible in writing mode by the credit recharging machine alone. An external access terminal VL has been shown. An external access terminal VL has been shown. This could be the same terminal as the terminal ID with an appropriate multiplexing of signals. The register is constituted by an electrically erasable and reprogrammable memory.

The following is the method of validation: when the card is being recharged, the recharging machine reads the content Z of the instructed value counter. It increments the counter until the new instructed value Y desired. Starting from the new content and from the identification code read in the register RID, it establishes a validation code according to a well-defined algorithm. This code is recorded in the validation register RVL.

During use in a card reader associated with a services dispensing machine (telephone booth), the reader starts by reading the content of the instructed value counter and of the identification and validation registers at the terminals CR, ID, VL. It ascertains that these contents are compatible, taking into account the algorithm used by the recharging machine. For example, it redoes the reverse algorithm on the basis of the content of the validation register or it redoes the same algorithm as the recharging machine and ascertains that the result of the computation coincides with the content of the validation register RVL.

If there is no compatibility among the contents of the two registers and of the counter, the card reader prohibits the dispensing of services or products requested by the user. It can also prevent the card from being restored to the user.

The checking of the validation register does not necessarily imply the execution of the starting algorithm or of the reverse algorithm. In certain cases, it may be restricted to a briefer checking of parity computations etc.

The identification and validation codes are not necessarily contained in registers directly connected to external terminals of the integrated circuit. They may be contained in specific zones of the memory MEM, these zones being accessible through an address decoder. The checking of the card then requires an addressing of these specific zones of the memory MEM since it is these zones that have the function of the validation register RVL and identification register RID.

The invention makes it possible, notably, to easily make high-capacity telephone cards for people who much need to use public phone booths for long-distance calls.

What is claimed is:

1. An electronic memory card for counting units, said memory card being adapted to count up to a total of $N \times P$ units, where N and P are integers, comprising
a memory zone with an array of P electrically programmable memory cells each of which has two possible states which are respectively a non-programmed state and a programmed state, wherein a programming step of one memory cell from the non-programmed state to the programmed state represents a counting of one unit;
means for successively programming the P cells;
a page counter for counting groups of P units, each group of P units being referred to as a page of units;
an incrementation circuit for incrementing the page counter by one unit when all the P cells have been successively programmed;
erasing means for re-setting the P cells to said non-programmed state after they have been successively programmed;
a credit counter, having a maximum count to a variable integer Z which at most is equal to N, and wherein Z represents an available credit proportional to units and a number of pages of P units;
a comparator connected to the page counter and the credit counter for comparing the contents of said counters and for emitting a no-more-credit signal when the content of the page counter corresponds to Z; and the credit counter having a connection means for it to be incremented from outside the memory card.

2. A memory card according to claim 1, further comprising means for transmitting to outside the card the no-more-credit signal, and means controlled by said no-more-credit signal for preventing re-setting of the programmed cells.

3. A memory card according to claim 1, wherein the page counter and the credit counter are both unidirectional nonerasable counters whereby their count cannot be returned to zero or to any prior content.

4. A memory card according to any one of claims 1 to 3, further comprising an identification register containing an identification number of the card, a validation register for storing a validation code, said validation code being the result of a computation using an algorithm operating on the contents of both the identification register and the credit counter the validation register having means for enabling said validation register to be read out and written into from outside the card.

5. A system for the exploitation of a memory card according to claim 4, comprising memory cards, card activated apparatus associated with installations for the dispensing of products or services, and credit recharging machines for the cards, wherein:

the credit recharging machines are adapted for incrementing the content of the credit counter by an integer M such that Z+M remains smaller than or equal to N, where N is the maximum content of the credit counter, the credit recharging machines are adapted for reading the content of the identification register of the card, performing a validation algorithm involving the content of the identification register and of the new content Z+M of the credit counter, and recording the result of the algorithm in the validation register of the card, the card activated apparatus are capable of reading the contents of the credit counter, the validation register and the identification register, and of checking the compatibility of these three contents with the used algorithm, and capable of inhibiting the use of the card activated apparatus if an incompatibility is detected.

* * * * *